Jan. 4, 1949.   F. A. STEVENS   2,457,938
OPHTHALMIC MOUNTING WITH CONCEALED LENS-CARRYING
AND NOSE-GUARD-CARRYING ARMS
Filed March 23, 1946
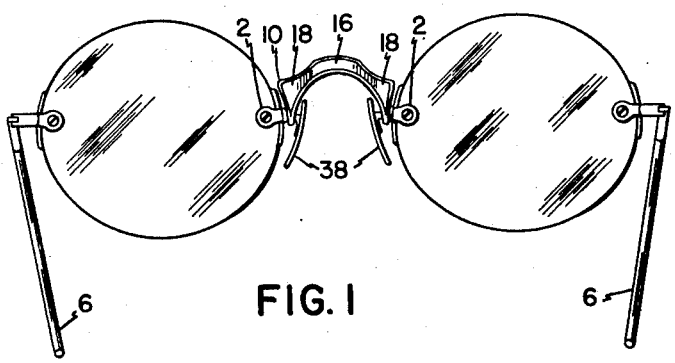
FIG. I
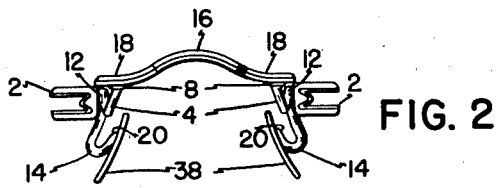
FIG. 2
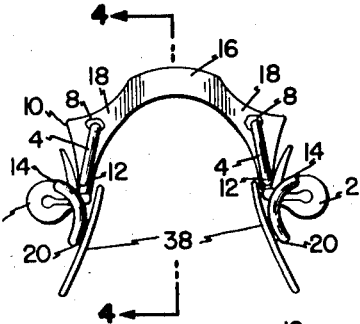
FIG. 3
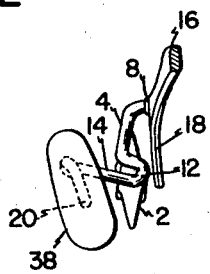
FIG. 4
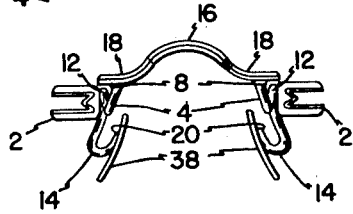
FIG. 5
INVENTOR.
FREDERICK A. STEVENS
BY
*David Rines*
ATTORNEY

Patented Jan. 4, 1949

2,457,938

UNITED STATES PATENT OFFICE 2,457,938

OPHTHALMIC MOUNTING WITH CONCEALED LENS-CARRYING AND NOSE-GUARD-CARRYING ARMS

Frederick A. Stevens, Providence, R. I.

Application March 23, 1946, Serial No. 656,548

1 Claim. (Cl. 88—42)

The present invention relates to ophthalmic mountings, and more particularly to the connections between the bridge members and the lenses and nose guards thereof.

Connections of the above-described character must be made adjustable, in order to provide for different pupillary distances and different nose shapes. Proposals have heretofore been made for effecting the adjustments without changing the shape of the bridge member. These proposals have involved the use of an adjustable arm or arms connecting the lenses and the nose guards to the bridge member through an interposed arm or arms. The presence of the additional arm or arms, however, detracts from the beauty of the ophthalmic mounting, and beauty is an important consideration in connection with a mounting that is worn on the face, in full view of all observers.

It is accordingly an object of the present invention to provide for a wide range of adjustment of the positions of the lens-carrying members and the nose guards without in any way marring the appearance of the ophthalmic mounting.

With this end in view, a feature of the invention resides in concealing the lens-carrying and nose-guard-carrying arms behind the bridge member so as to render them substantially invisible from the front, the arms being nevertheless bendable to provide a very wide range of adjustment.

Other and further objects will be explained hereinafter, and will be particularly pointed out in the appended claim.

The invention will now be more fully explained in connection with the accompanying drawings, in which Fig. 1 is a front elevation of an ophthalmic mounting embodying the invention in preferred form; Fig. 2 is a plan, upon a larger scale, of the bridge member, the lens-holding members, and the nose-guard-holding members, with connecting parts; Fig. 3 is a rear elevation corresponding to Fig. 2; Fig. 4 is a section taken upon the line 4—4 of Fig. 3, looking in the direction of the arrows; and Fig. 5 is a view similar to Fig. 2, but showing a bridge member of different shape and size.

The ophthalmic mounting of the present invention is illustrated as comprising two lens-holding strap members 2 connected together by a bridge member and having guards 38. The mounting is shown as of the type that is supported upon the face by the guards 38 engaging the sides of the nose and temples 6 that engage behind the ears. The bridge is therefore provided with an intermediate raised portion 16 and two terminal or end portions 18, respectively joined to the intermediate portion at the ends 10 thereof and depending therefrom. The lens-holding members 2 are shown as of the rimless type, but they may be of the continuous metal or non-metal lens-holding type for completely encircling the lenses, or of any other desired type.

The bridge member is connected to the lens-holding members 2 and the guards 38 by means of two one-part arms 4. The upper end 8 only of each arm 4 is connected to the bridge member at the rear thereof in the neighborhood of the junction 10 between the intermediate portion 16 and one of the end portions thereof. The arms 4 extend freely downward from their upper ends 8 to their lower ends 12 behind the respective end portions 18 of the bridge, so as to be substantially entirely or completely concealed behind the bridge, when viewed from the front of the bridge, by the corresponding ends 18 of the bridge, thereby being rendered invisible to an observer from the front. The lower end 12 of each arm 4 is disposed in the neighborhood of the lower end of the corresponding end portion 18. This provides for a very much wider range of adjustment, while maintaining the arms 4 concealed, than if the arms 4 were attached to the bridge at the lower ends of the end portions 18.

The lens-carrying members 2 are secured to the lower ends 12 of the respective arms 4, so as to extend outward beyond, but behind, the corresponding ends 18 of the bridge, thereby becoming visible. Because the lens-carrying members 2 are positioned behind the bridge, it becomes possible to secure them to the outer side faces of the lower ends 12 of the respective arms 4, yet without exposing these lower ends 12 to the view of an observer from the front. The lower end 12 of each arm 4 is furthermore provided with an extending arm or strap 14 carrying a nose-guard support 20 for the nose guard 38. The extending arms 14, like the arms 4, are concealed from the front of the mounting, as appears clearly from Fig. 1.

The arms 4 and 14 are bendable throughout their lengths to permit of a wide range of adjustment of the positions of the lens-carrying members 2, in order to accommodate patients with different pupillary distances, and of the nose guards 38, to accommodate different shapes of nose against which the nose guards 38 rest, while nevertheless maintaining the arms 4 and 14 concealed. The lens-carrying members 2 and the nose guards 38 are alone visible from the front at each side of the ends 18 of the bridge.

If the bridge member is of suitable shape and size to start out with, these adjustments of the lens-carrying members 2 and of the nose guards 38, to suit the needs of different patients, may be effected without any adjustment of the bridge member. Two different shapes and sizes of bridge member are illustrated in Figs. 2 and 5, the latter of smaller pupillary distance and greater intermediate convexity than the former. If the exact size and shape of bridge desired for a particular patient happens not to be in stock, however, the bridge may also be somewhat adjusted, as well, in order to yield the proper pupillary distance and convexity of the bridge member without introducing a degree of adjustment of the arms 4 sufficiently large to expose them instead of concealing them.

Though bendable, for purposes of adjustment, the arms 4 and 14 are not resilient or elastic or otherwise yieldable. Resilience or yieldability would destroy the benefit of the adjustment for pupillary distance and the adjustment for properly positioning the nose guards 38 on the sides of the nose.

Once adjusted, therefore, the arms 4 and 14 will remain rigidly in adjusted position. The intermediate portion 16 and the end portions 18 of the bridge member, however, are nevertheless maintained out of contact with the nose, retaining the attractive appearance of the mounting.

Modifications will occur to persons skilled in the art within the spirit and scope of the invention as defined in the appended claim.

What is claimed is:

An ophthalmic mounting comprising a bridge member having an intermediate portion and two end portions respectively joined to the intermediate portion and depending therefrom, and two one-part arms each having upper and lower ends, the upper end only of one of the arms being connected to the bridge member in the neighborhood of the junction between the intermediate portion and one of the end portions, the upper end only of the other arm being connected to the bridge member in the neighborhood of the junction between the intermediate portion and the other end portion, the lower ends of the arms being disposed in the neighborhood of and to the rear of the lower ends of the respective end portions, the points of connection between the upper ends of the arms and the bridge member being disposed at the rear of the bridge member and the arms extending downward below their respective said points of connection behind the respective end portions to conceal the arms substantially completely behind the respective end portions of the bridge member when viewed from the front of the bridge member, the lower end of each arm being provided with a lens-carrying member and a nose-guard-carrying member, the lens-carrying members being secured to the outer side faces of the said lower ends of the said arms behind the lower portions of the respective end portions of the bridge, and a nose guard carried by each nose-guard-carrying member, the arms and the nose-guard-carrying members being bendable throughout their lengths to permit of a wide range of adjustment of the positions of the lens-carrying members and the nose guards while maintaining the arms substantially completely concealed behind the respective end portions.

FREDERICK A. STEVENS.

REFERENCES CITED

The following references are of record in the file of this patent:

UNITED STATES PATENTS

| Number | Name | Date |
|---|---|---|
| 2,158,159 | Splaine | May 16, 1939 |
| 2,233,063 | Stevens | Feb. 25, 1941 |